Patented Aug. 14, 1934

1,969,882

UNITED STATES PATENT OFFICE 1,969,882

MANUFACTURE OF NEW CELLULOSE ESTERS

Henry Gault and Bernard Marius Robert Angla, Lyon, France, assignors to Societe Des Usines Chimiques Rhone-Poulenc, Paris, France No Drawing. Application November 26, 1929, Serial No. 409,997. In Great Britain February 25, 1929

2 Claims. (Cl. 260—102)

This invention relates to the manufacture of cellulose esters and it has for its object the manufacture of new cellulose crotonates.

We have found that new cellulose crotonates, different from those hitherto described in the literature, are obtained by subjecting to a partial saponification tri-crotonic esters, and particularly the tricrotonic esters obtained by the process which is the object of U. S. A. patent specification No. 1,908,746 dissolved into a solvent containing water, and, preferably, also a saponification catalyst.

The new products so obtained are characterized by the fact that they have some solubilities which are different from those of tricrotonic esters. These solubilities vary with the degree of partial saponification arrived at when the operation was stopped; in the case of a slightly saponified crotonate, they are akin to those of cellulose tricrotonate, but, on the contrary, for crotonates the saponification of which has been pushed further, some of these solubilities are definitely different from those of the initial tricrotonic ester. For instance, the crotonic esters which are near cellulose dicrotonate, while being, like the initial crotonate, soluble in acetone, chloroform and a mixture of benzene with alcohol, are insoluble in benzene at ordinary temperature, when the tricrotonate which constituted the starting point is perfectly soluble in it. On the other hand, if the saponification is pushed further, compounds are arrived at which are soluble in mixtures of acetone and water, in which the initial tricrotonate is definitely insoluble.

The process of manufacture of these new cellulose crotonates consists in subjecting a cellulose tricrotonate, in solution in a solvent containing water, to the saponifying action of this water, and that preferably, in presence of saponification catalysts, until the degree of solubility in a specified solvent is attained, which can be ascertained by testing the solubility of specimens taken from the reacting mass.

In carrying out the present process, all the solvents of cellulose tricrotonate may be used for the solution of this compound, adding to them the necessary quantity of water and the catalyst, if any, it being well understood that the whole must constitute a homogeneous mixture. For example, acetic acid or its homologues, or crotonic acid, or their mixtures can be used. In certain cases the addition of alcohol to the saponifying bath helps in obtaining the homogeneous medium required, although it is not indispensable.

The products used in the saponification of cellulose acetate and of the other cellulose esters may be used as catalysts, for example: mineral acids, fatty or aromatic sulphonic acids, acid salts such as bisulphates, zinc chloride, etc. The temperature at which the process must be carried out is variable according to the catalyst used, the proportions of the reagents in presence and the duration of the saponification. Generally speaking, a higher temperature increases the speed at which the operation proceeds. The saponification is pursued until the required degree, under the control of test samples, after which the crotonic ester is withdrawn from the solutions by known means such as precipitation, and it is purified by the usual methods.

The invention can be applied either to a solution of cellulose crotonate prepared from an already isolated tricrotonate, or to a solution of cellulose tricrotonate such that it is obtained by crotonylation of cellulose, such as for example, the action of crotonic anhydride and of condensing agent upon cellulose; in this last case the catalyst used for carrying out the condensation may serve for the saponification; one can also add a new quantity of this catalyst or neutralize it, partially or completely and add another catalyst The new cellulose crotonates prepared according to the present invention may be used for all the applications of cellulose acetates and particularly for the manufacture of plastic masses analogous to celluloid, of films, of artificial silk or of varnish. Generally, the mechanical and plastic properties of the products which can so be obtained by their means are superior to those of the products prepared with cellulose tricrotonates; the films, for example, are more flexible. Finally, they have the valuable property of containing in their molecule several double bonds which can be subsequently saturated by fixation with various radicals and elements, so that they open a way to the preparation of new industrial products.

Several examples which are by no means limitative are given below as illustrations, of the manner in which the invention is carried out.

The parts are by weight.

*Example 1.*—Cellulose tricrotonate is first prepared in the following manner U. S. A. patent specification No. 1,908,746: a mixture of 80 parts cotton and 40 parts crotonic acid is stirred for 2 hours, and then is raised to a temperature of 90° C. for 16 hours. After cooling to normal temperature, 345 parts of crotonic anhydride are added, the mixture is stirred for 2 hours, and a mixture of 400 parts of benzene and 112 parts of methane sulphonic acid is run into the mass. By stirring for 3 to 4 hours at a temperature between 25° and 35° C., a clear, homogeneous, viscous solution, of cellulose tricrotonate free from fibres is obtained in the crotonylation bath.

The saponification is then carried out as follows: to the solution so obtained, 600 parts of acetic acid (80%) and 50 parts of ethyl alcohol are added and the mixture is stirred at 48° C. for 18 to 19 hours; after precipitation, washing and drying, a cellulose crotonate is obtained which is soluble in pure acetone, a mixture of acetone with alcohol, chloroform, a mixture of benzene with alcohol, and acetic acid and is insoluble in water, ether, ethyl alcohol, methyl alcohol, a mixture of acetone with water. Its collodions give by evaporation a homogeneous, transparent supple and tough film.

*Example 2*.—Cellulose tricrotonate is prepared as follows U. S. A. patent specification No. 1,908,746: 100 parts of cotton and 50 parts of crotonic acid are stirred for 2 hours; the whole is then maintained at 90° C. for 16 hours. After cooling, 500 parts of crotonic anhydride are added and the whole is stirred for 2 hours at 20° C. 500 parts of benzene and 140 parts of methane sulphonic acid (99%) are then added to the mass so obtained. After two hours stirring at 35° to 40° C. a viscous, homogeneous, solution of tri-crotonic ester is obtained in the esterification bath.

The saponification is then proceeded with as follows: a mixture of 600 parts of crotonic acid, 150 parts of water and 200 parts of ethyl alcohol is added to the solution. After stirring the whole for 20 hours at 45° C., the saponified crotonic ester is obtained by precipitation with 85% alcohol or any other suitable liquid. After washing and drying this ester is in the form of light white flakes soluble in acetone, chloroform, a mixture of benzene with alcohol, benzylic alcohol, and insoluble in water, alcohol, ether, ligroin. By evaporation of its collodions, flexible films of good toughness are obtained.

What we claim and desire to secure by Letters Patent is:—

1. In the process of preparation of cellulose crotonates, the step which consists in subjecting a cellulose tricrotonate which has been obtained by treating the cellulose with crotonic anhydride in presence of methane sulphonic acid and benzene and which is in solution in the esterifying bath, to the saponifying action of water, this water being introduced by means of diluted acetic acid to which ethyl alcohol is added, in order to obtain a homogeneous medium and precipitating and drying the cellulose crotonate.

2. The cellulose crotonates resulting from the treatment of cellulose with crotonic anhydride in the presence of methane sulphonic acid and benzene thereby to obtain a cellulose tri-crotonate which is in solution in the esterifying bath and subjecting said cellulose tri-crotonates to the saponifying action of water introduced by means of diluted acetic acid and to which ethyl alcohol is added.

HENRY GAULT.
BERNARD MARIUS ROBERT ANGLA.